(12) United States Patent
Revis

(10) Patent No.: US 6,822,020 B2
(45) Date of Patent: *Nov. 23, 2004

(54) TETRAHALOSILANE BLENDS FOR TREATING SILICA

(75) Inventor: Anthony Revis, Freeland, MI (US)

(73) Assignee: Dow Corning Corporation, Midland, MI (US)

( * ) Notice: Subject to any disclaimer, the term of this patent is extended or adjusted under 35 U.S.C. 154(b) by 260 days.

This patent is subject to a terminal disclaimer.

(21) Appl. No.: 10/199,400

(22) Filed: Jul. 18, 2002

(65) Prior Publication Data

US 2004/0014867 A1 Jan. 22, 2004

(51) Int. Cl.[7] .............................. C08K 9/06; C08K 3/34; C04B 14/04; C08L 9/00; C01B 33/08

(52) U.S. Cl. ................. 523/216; 523/205; 523/213; 523/214; 523/217; 524/492; 524/574; 524/575; 524/575.5; 106/489; 106/490; 423/335; 423/342; 428/403; 428/404; 428/405

(58) Field of Search ................. 524/492, 573–575.5, 524/571, 588; 523/216, 205, 213, 214, 217; 106/489, 490; 423/335, 342, 213, 214, 216, 217, 339; 428/403–405, 446, 447; 427/212, 215, 220; 516/100; 528/10, 12, 39

(56) References Cited

U.S. PATENT DOCUMENTS

| | | | |
|---|---|---|---|
| 3,471,435 A | 10/1969 | Miller | 260/37 |
| 3,677,784 A | 7/1972 | Hittmair et al. | 106/309 |
| 4,849,022 A | 7/1989 | Kobayashi et al. | 106/940 |
| 5,908,660 A | 6/1999 | Griffith et al. | 427/220 |
| 6,005,027 A * | 12/1999 | Guillet et al. | 523/209 |
| 6,051,672 A | 4/2000 | Burns et al. | 528/10 |
| 6,174,926 B1 * | 1/2001 | Menon et al. | 516/100 |
| 6,384,125 B1 | 5/2002 | Bergstrom et al. | 524/492 |

FOREIGN PATENT DOCUMENTS

| | | | |
|---|---|---|---|
| WO | WO 98/45361 | 10/1998 | C08K/3/04 |
| WO | WO 01/12708 A1 | 2/2001 | C08K/3/00 |

* cited by examiner

Primary Examiner—Vasu Jagannathan
Assistant Examiner—Vickey Ronesi
(74) Attorney, Agent, or Firm—Jim L. De Cesare

(57) ABSTRACT

Modified silica fillers are prepared by contacting silica with blends or mixtures containing diorganodihalosilanes and tetrahalosilanes in weight ratios of 1:0.1 to 1:2, respectively. While dialkyldichlorosilanes and tetrahalosilanes such as dimethyldichlorosilane and silicon tetrachloride, respectively, are most preferred, the blends or mixtures may also comprise compositions containing other silanes such as mercaptopropyltriethoxysilane.

8 Claims, No Drawings

TETRAHALOSILANE BLENDS FOR TREATING SILICA

FIELD OF THE INVENTION

This invention is related to a method of making a modified silica filler in which silica is contacted with a blend or mixture of a diorganodihalosilane and a tetrahalosilane in a weight ratio of 1:0.1 to 1:2, respectively.

BACKGROUND OF THE INVENTION

This is an improvement in methods of modifying silica fillers, as described for example, in U.S. Pat. No. 6,051,672 (Apr. 18, 2000), assigned to the same assignee as the present invention. While the '672 patent contains a general formula (1) which broadly interpreted includes tetrahalosilanes, (i) no particular tetrahalosilane compounds are disclosed in the '672 patent, (ii) the '672 patent does not describe any particular mixture or blend of tetrahalosilane compounds and diorganodihalosilane compound as being any more effective than any other blend, (iii) nor does the '672 patent teach any particular ratio of these silane compounds as being necessary to achieve new and unexpected results, i.e., the ability to deposit more siloxane on silica, vis a viz, improved its hydrophobicity.

Furthermore, it is generally recognized in the art that treating agents used to impart hydrophobicity to surfaces should contain organic or hydrocarbon groups characteristic of fats, oils, and waxes such as alkyl groups. However, since tetrahalosilanes such as silicon tetrachloride $SiCl_4$ contain no organic or hydrocarbon groups in their molecule, it was highly unexpected that they would possess this functional utility.

SUMMARY OF THE INVENTION

The invention is directed to a method of making modified silica fillers in which silica is contacted with a blend or mixture of organosilicon compounds. In particular, it is directed to an improvement in treating silica with blends or mixtures of diorganodihalosilanes and tetrahalosilanes, in weight ratios of 1:0.1 to 1:2, respectively.

Preferably, the weight ratio is 1:0.3 to 1:1, most preferably 1:0.5. Similarly, the blend or mixture is preferably a dialkyldichlorosilane and a tetrahalosilane such as silicon tetrachloride, silicon tetrabromide, and silicon tetraiodide, most preferably dimethyldichlorosilane and silicon tetrachloride. In some additional embodiments, the blend or mixture may also comprise compositions containing (i) dimethyldichlorosilane, (ii) silicon tetrachloride, and (iii) mercaptopropyltriethoxysilane.

These and other features of the invention will become apparent from a consideration of the detailed description.

DETAILED DESCRIPTION OF THE INVENTION

The silica used to make the modified silica fillers according to this invention are the colloidal or precipitated silicas of the type used to formulate polymeric compositions such as rubber, particularly those rubber compositions used in the manufacture of vehicle tires for improving the mechanical properties of tire rubber. Such silicas are described in detail in the '672 patent, and in U.S. Pat. No. 5,908,660 (Jun. 1, 1999), to which reference may be had and which are considered incorporated herein by reference.

Mineral fillers such as silica, having a small particle size and a large surface area, are capable of increasing the tensile strength of rubber compounds, and therefore are useful as a reinforcing material for rubber; particularly when the mineral surfaces of the filler are converted to hydrophobic low energy surfaces. Typically, this is carried out using methylchlorosilanes which react with the surface water of mineral surfaces or the water present in a reaction, i.e., hydrolysis and condensation of silanols, liberating hydrochloric acid and concurrently depositing a very thin film of methylpolysiloxanes with low critical surface tensions not wetted by water. A very simplified representation is $\equiv Si-Cl + H_2O \rightarrow \equiv SiOH + HCl \rightarrow \equiv Si-O-Si\equiv$.

Among some of the other reasons it may be desirable to impart hydrophobicity to silica surfaces, is that it renders them easily dispersible in organic systems such as defoamers, and in food, dairy, and vegetable processing. In other applications, silica particles rendered sufficiently hydrophobic can be held at oil-water interfaces. Surfaces of oxide minerals modified with monolayers of organofunctional silanes to render such surfaces hydrophobic make them useful in oil recovery, ore flotation, pigment dispersion, and for surface modification of metals. These water repellent, low energy surfaces are useful in water resistant treatments for masonry, electrical insulation, packing for chromatography, and in non-caking fire extinguishers. Ceramic insulators treated in this fashion are capable of maintaining high electrical resistivity under humid conditions. Forming an insoluble water resistant methylpolysiloxane film on a surface protects brick, mortar, sandstone, and concrete from spalling, cracking, and efforescence.

When silicone rubbers are reinforced with untreated silicas, reactions can take place causing the mixture to become tough and nervy, making it difficult to further process the mixture unless processing is performed immediately after the mixture is prepared. Reactions known as structuring and crepe aging can be prevented by treating silica surfaces with materials capable of reacting with hydroxyl radicals present on silica surfaces. While many methods have been devised for treating silica as powders and water dispersions to prevent structuring and crepe aging, the present invention provides a simplified avenue for producing treated silicas useful in reinforcing silicone rubbers as well.

The silica treating agents according to the invention are blends of organodichlorosilanes and tetrahalosilanes such as silicon tetrachloride, silicon tetrabromide, and silicon tetraiodide. The organodichlorosilanes may contain alkyl groups, cycloalkyl groups, araalkyl (arylalkyl) groups, alkaryl (alkylaryl) groups, aryl groups, and certain substituted groups which are not reactive with respect to silica surfaces.

Some examples of alkyl groups are methyl, ethyl, propyl, butyl, hexyl, octyl, decyl, dodecyl, octadecyl, and nonadecyl. Some examples of cycloalkyl groups are cyclobutyl and cyclohexyl. Some examples of araalkyl (arylalkyl) groups are benzyl, phenylethyl, and 2-phenylpropyl. Some examples of alkaryl (alkylaryl) groups are tolyl and mesityl. Some examples of aryl groups are phenyl, xenyl, naphthyl, and anthracyl. Some examples of substituted groups which are not reactive with respect to a silica surface are halogenated alkyl groups and aryl groups such as chloromethyl, dichloromethyl, trichloromethyl, 3-chloropropyl, chlorocyclohexyl, chlorophenyl, and dichloroxenyl; alkyl groups containing alkoxy radicals such as methoxy, ethoxy, butoxy, and pentoxy; alkyl groups containing sulfido (—S—), disulfido, or polysulfido radicals; and alkyl groups containing cyano (—C$\equiv$N) radicals.

Representative of some organodichlorosilanes and tetrahalosilanes which can be used according to this invention are silicon tetrachloride, silicon tetrabromide, silicon tetraiodide, n-butylmethyldichlorosilane, t-butylmethyldichlorosilane, t-butylphenyldichlorosilane, cyclohexylmethyldichlorosilane, n-decylmethyldichlorosilane, di-n-butyldichlorosilane, di-t-butyldichlorosilane, dicyclohexyldichlorosilane, dicyclopentyldichlorosilane, diethyldichlorosilane, di-n-hexyldichlorosilane, dimesityldichlorosilane, dimethyldichlorosilane, di-n-octyldichlorosilane, di-phenyldichlorosilane, di-(p-tolyl)dichlorosilane, docosylmethyldichlorosilane, dodecylmethyldichlorosilane, ethylmethyldichlorosilane, n-heptylmethyldichlorosilane, hexylmethyldichlorosilane, n-octylmethyldichlorosilane, phenylethyldichlorosilane, phenylmethyldichlorosilane, and p-tolylmethyldichlorosilane.

A general method of making modified silica fillers according to the invention is described below in Example A, although the modified silica fillers can be made by any known and accepted technique, for example, as described in detail in the '660 patent, the '672 patent, and in U.S. Pat. No. 6,384,125 (May 7, 2002). While these patents describe general methods, they fail to describe the features of this invention, i.e., the use of a particular mixture or blend of a diorganodihalosilane and tetrahalosilane compounds in a particular ratio.

When used in rubber compositions for manufacturing vehicle tires, other conventional additives may be used along with the modified silica filler, including other fillers such as carbon black, various oils, plasticizers, accelerators, antioxidants, heat stabilizers, light stabilizers, zone stabilizers, extenders, and coloring pigments.

EXAMPLES

The following examples are set forth in order to illustrate the invention in more detail. The silica slurry used in the examples contained 6.5 percent by weight of silica, and is a commercial product of PPG Industries, Inc., Pittsburgh, Pa. Neutralization was carried out by using a standard solution containing 25 percent by weight of sodium hydroxide, and it was prepared by dissolving 1000 grams of sodium hydroxide pellets in 3000 milliliter of deionized water.

The apparatus used in treating the silica consisted of a 5-liter round-bottom reaction flask, with ball joints, a Teflon® shaft stirring paddle assembly, an overhead electrical stirring motor, and a Type-K thermocouple temperature controller with a flexible heating mantle. The reaction flask was surmounted with a Dean-Stark trap and water cooler condenser with a port for a sealed glass thermocouple well directly submersed into the reaction flask. The third neck of the reaction flask was sealed with a ball-joint cap or an addition funnel. Filtration and washing of treated silica fillers and silica filler cakes was conducted with a 253 mm Coors Porcelain Buchner funnel containing Whatman filter paper. The funnel was mounted on a 4-liter filter flask. A Fisher brand Digital Conductivity Meter was used to measure the conductivity of the filtrate from the washing process. A Mettler Toledo Portable pH\Ion Meter, Model No. MP125 was used to measure pH.

The following procedure, used in Example 2, represents a general procedure which was repeated in Examples 1, 3, and 4. Data for Examples 1–4 is shown in Table 1.

Example A

A General Procedure for Examples 1–4

The reaction flask was charged with 2000 g of silica slurry and 165 g of concentrated sulphuric acid. The slurry was heated to a temperature of 70° C. and the heat was then turned off. At this point, a mixture containing 9.10 g of tetrachlorosilane and 25.5 g of dimethyldichlorosilane was added directly to the reaction flask via a long-stem funnel in rapid fashion over a period of about 2–7 minutes. The treated slurry was then allowed to stir as it cooled to room temperature over a 60-minute period.

To the stirred slurry was added 600 mL of a solution containing 25 percent by weight of sodium hydroxide, in order to adjust the pH in the range of 3.4 to 3.7. The neutralized slurry was transferred to the Buchner funnel and vacuum filtered to removed the aqueous phase. The filter cake was then washed repeatedly with copious amounts of water until the filtrate read less than 100 micro ohms. After allowing it to air-dry overnight, the filter cake was transferred to plastic pails with lids and spray dried as follows.

The air-dried treated silica was re-slurried in deionized water to provide a slurry containing 20–40 percent by weight of the treated silica. The slurry was mixed until all of the solids were broken up. The slurry was then pumped to a Niro Atomizer spray drier at a rate of about 20 ml/minute with an inlet temperature of 260° C. and an outlet temperature of between 120–140° C. The dried and treated silica product was collected and stored in glass jars.

An elemental analysis of the treated silica was conducted by an independent testing laboratory. The results of elemental analyses obtained for treated silica fillers prepared in Examples 1–4 are shown in Table 1. In Table 1, MPTES is 3-mercaptopropyltriethoxysilane HS—$CH_2CH_2CH_2$—Si$(OCH_3)_3$ and DMDCS is dimethyldichlorosilane.

TABLE 1

| | | | | Percent Loss Results | | | |
|---|---|---|---|---|---|---|---|
| | Grams | Grams | Grams | Percent Carbon | | | Rate, Addition |
| Example | MPTES | DMDCS | SiCl$_4$ | Theory | Actual | % Loss | Minutes |
| 1 | | 25.5 | | 3.28 | 1.38 | 58 | 2 |
| 2 | | 25.5 | 9.1 | 3.20 | 2.27 | 29 | 2 |
| 3 | 9.1 | 25.5 | 9.1 | 3.76 | 3.80 | 0 | 7 |
| 4 | 9.1 | 25.5 | | 4.00 | 2.58 | 36 | 7 |

The new and unexpected results obtained according to the invention, i.e., the deposit of more siloxane, can be appreciated by comparing Examples 1 and 2, which show that the Percent Loss was decreased from 58 percent in Example 1 where only the dichlorosilane was used, to 29 percent in Example 2 where a blend of the dichlorosilane and tetrachlorosilane were employed. As can be seen in Example 3, a further improvement can be obtained by addition of other silanes to the blend. Example 4 shows that other silanes without the tetrahalosilane in the blend or mixture, do not account for improved performance. A comparison of Examples 3 and 4 shows that rate of addition is not a critical factor in improving deposits of siloxanes on silica surfaces.

Thus, the comparison of Example 1 with Example 2 shows a clear improvement. Example 3 shows that inclusion of other additives do not have a deleterious affect; in fact, their addition to the blend of dichlorosilanes and tetrahalosilanes may actually be advantageous in some instances.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of making modified silica fillers by treating silica with a blend or mixture of silicon containing compounds consisting of a dialkyldihalosilane and a tetrahalosilane selected from the group consisting of silicon tetrachloride, silicon tetrabromide, and silicon tetraiodide, in a weight ratio of 1:0.1 to 1:2, respectively.

2. A method according to claim 1 in which the weight ratio is 1:0.3 to 1:1.

3. A method according to claim 2 in which the weight ratio is 1:0.5.

4. A method according to claim 1 in which the dialkyldihalosilane is dimethyldichlorosilane and the tetrahalosilane is silicon tetrachloride.

5. A modified silica filler prepared according to the method of claim 1.

6. A rubber composition containing the modified silica filler prepared in claim 1.

7. A method of making modified silica fillers by treating silica with a blend or mixture of silicon containing compounds consisting of a dialkyldihalosilane, a tetrahalosilane, and an alkoxysilane.

8. A method according to claim 7 in which the alkoxysilane is mercaptopropyltriethoxysilane.

* * * * *

UNITED STATES PATENT AND TRADEMARK OFFICE
CERTIFICATE OF CORRECTION

PATENT NO. : 6,822,020 B2
APPLICATION NO. : 10/199400
DATED : November 23, 2004
INVENTOR(S) : Anthony Revis It is certified that error appears in the above-identified patent and that said Letters Patent is hereby corrected as shown below:

In Column 6, lines 15-16, after "consisting of", delete "a dialkyldihalosilane, a tetrahalosilane, and an alkoxysilane" and insert --dimethyldichlorosilane, silicon tetrachloride, and mercaptopropyltriethoxysilane--.

In Column 6, lines 17-18, delete Claim "8. A method according to claim 7 in which the alkoxysilane is mercaptopropyltriethoxysilane."

Signed and Sealed this

Twenty-ninth Day of July, 2008

JON W. DUDAS
*Director of the United States Patent and Trademark Office*